(12) United States Patent
Larsson et al.

(10) Patent No.: US 8,353,052 B2
(45) Date of Patent: Jan. 8, 2013

(54) PROVIDING SERVICES TO A GUEST DEVICE IN A PERSONAL NETWORK

(75) Inventors: Bo Håkan Larsson, Malmö (SE); Bengt Gunnar Stavenow, Lund (SE); Jan Robert Tobias Ritzau, Veberöd (SE); Henrik Sven Bengtsson, Lund (SE); Anders Wilhelm Östsjö, Bjärred (SE); Sten Håkan Minör, Lund (SE)

(73) Assignee: Sony Mobile Communications AB, Lund (SE)

( * ) Notice: Subject to any disclaimer, the term of this patent is extended or adjusted under 35 U.S.C. 154(b) by 1036 days.

(21) Appl. No.: 11/937,795

(22) Filed: Nov. 9, 2007

(65) Prior Publication Data

US 2009/0064346 A1 Mar. 5, 2009

Related U.S. Application Data

(60) Provisional application No. 60/969,681, filed on Sep. 3, 2007.

(51) Int. Cl.
*H04N 7/16* (2006.01)
*H04L 29/06* (2006.01)
(52) U.S. Cl. ......................................... 726/29; 713/155
(58) Field of Classification Search ........................ None
See application file for complete search history.

(56) References Cited

U.S. PATENT DOCUMENTS

| 6,892,225 | B1 * | 5/2005 | Tu et al. .......................... 709/217 |
| 7,188,360 | B2 * | 3/2007 | Gerdes et al. ..................... 726/4 |
| 7,340,769 | B2 * | 3/2008 | Baugher .......................... 726/5 |
| 7,546,373 | B2 * | 6/2009 | Lehew et al. .................. 709/229 |
| 7,590,246 | B2 * | 9/2009 | Calmels et al. ............... 380/270 |
| 2004/0111520 | A1 * | 6/2004 | Krantz et al. .................. 709/229 |
| 2005/0250489 | A1 * | 11/2005 | Lazaridis .................... 455/426.1 |
| 2006/0014520 | A1 * | 1/2006 | Anderson et al. ............. 455/408 |
| 2006/0149967 | A1 | 7/2006 | Lee et al. |
| 2006/0183463 | A1 * | 8/2006 | Falk et al. ..................... 455/411 |
| 2006/0264202 | A1 * | 11/2006 | Hagmeier et al. ............. 455/411 |
| 2006/0280127 | A1 * | 12/2006 | Mizuno et al. ............... 370/254 |
| 2007/0056021 | A1 * | 3/2007 | Annic et al. ..................... 726/4 |

(Continued)

FOREIGN PATENT DOCUMENTS

EP 1 809 005 A2 7/2007

(Continued)

OTHER PUBLICATIONS

Notification of Transmittal of the International Search Report and the Written Opinion of the International Searching Authority, or the Declaration corresponding to PCT/IB2008/050776, dated Mar. 3, 2009, 12 pages.

(Continued)

*Primary Examiner* — Nathan Flynn
*Assistant Examiner* — Abdullah Almamun
(74) *Attorney, Agent, or Firm* — Sreenivas Vedantam; Moore & Van Allen PLLC

(57) ABSTRACT

A method may include sending personal network connection information from a mobile device to a guest device; sending authentication credentials from the mobile device to the guest device; receiving the authentication credentials in the personal network from the guest device; authenticating the guest device based on the authentication credentials; and granting access to the guest device to content stored in the personal network for a guest session.

22 Claims, 11 Drawing Sheets

U.S. PATENT DOCUMENTS

| | | | |
|---|---|---|---|
| 2007/0168458 A1* | 7/2007 | Costa-Requena et al. | 709/217 |
| 2007/0254630 A1* | 11/2007 | Moloney et al. | 455/410 |
| 2007/0266246 A1* | 11/2007 | Lee et al. | 713/168 |
| 2010/0135279 A1* | 6/2010 | Petersson et al. | 370/352 |
| 2011/0219419 A1* | 9/2011 | Reisman | 725/112 |

FOREIGN PATENT DOCUMENTS

| | | |
|---|---|---|
| EP | 1 821 493 A2 | 8/2007 |

OTHER PUBLICATIONS

C.R. Livingston, et al., "Remote Authentication Dial in User Services (RADIUS)," Internet Engineering Task Force, Request for Comment 2058, pp. 1-53, Jan. 1997.

C.R. Livingston, "RADIUS Accounting," Internet Engineering Task Force, Request for Comment 2059, pp. 1-21, Jan. 1997.

C.R. Livingston, et al., "Remote Authentication Dial in User Services (RADIUS)," Internet Engineering Task Force, Request for Comment 2138, pp. 1-54, Apr. 1997.

C.R. Livingston, "RADIUS Accounting," Internet Engineering Task Force, Request for Comment 2139, pp. 1-21, Apr. 1997.

G. Zorn, "Microsoft Vendor-specific RADIUS Attributes," Internet Engineering Task Force, Request for Comment 2548, pp. 1-34, Mar. 1999.

B. Aboba et al., "RADIUS Authentication Client MIB," Internet Engineering Task Force, Request for Comment 2618, pp. 1-12, Jun. 1999.

G. Zorn et al., "RADIUS Authentication Server MIB," Internet Engineering Task Force, Request for Comment 2619, pp. 1-14, Jun. 1999.

B. Aboba et al., "RADIUS Accounting Client MIB," Internet Engineering Task Force, Request for Comment 2620, pp. 1-11, Jun. 1999.

G. Zorn et al., "RADIUS Accounting Server MIB," Internet Engineering Task Force, Request for Comment 2621, pp. 1-13, Jun. 1999.

B. Aboba et al., "Implementation of L2TP Compulsory Tunneling via RADIUS," Internet Engineering Task Force, Request for Comment 2809, pp. 1-19, Apr. 2000.

C. Rigney, et al., "Remote Authentication Dial In User Service (RADIUS)," Internet Engineering Task Force, Request for Comment 2865, pp. 1-63, Jun. 2000.

C. Rigney, "RADIUS Accounting," Internet Engineering Task Force, Request for Comment 2866, pp. 1-24, Jun. 2000.

G. Zorn et al., "RADIUS Accounting Modifications for Tunnel Protocol Support," Internet Engineering Task Force, Request for Comment 2867, pp. 1-10, Jun. 2000.

G. Zorn et al., "RADIUS Attributes for Tunnel Protocol Support," Internet Engineering Task Force, Request for Comment 2868, pp. 1-17, Jun. 2000.

C. Rigney, et al., "RADIUS Extensions," Internet Engineering Task Force, Request for Comment 2869, pp. 1-39, Jun. 2000.

D. Mitton, "Network Access Servers Requirements: Extended RADIUS Practices," Internet Engineering Task Force, Request for Comment 2882, pp. 1-14, Jul. 2000.

B. Aboba et al., "RADIUS and IPv6," Internet Engineering Task Force, Request for Comment 3162, pp. 1-10, Aug. 2001.

B. Aboba, "IANA Considerations for RADIUS," Internet Engineering Task Force, Request for Comment 3575, pp. 1-7, Jul. 2003.

M. Chiba, et al., "Dynamic Authorization Extensions to Remote Authentication Dial In User Service (RADIUS)," Internet Engineering Task Force, Request for Comment 3576, pp. 1-25, Jul. 2003.

B. Aboba et al., "RADIUS (Remote Authentication Dial In User Service) Support for Extensible Authentication Protocol (EAP)," Internet Engineering Task Force, Request for Comment 3579, pp. 1-38, Sep. 2003.

P. Congdon, et al., "IEEE 802.1X Remote Authentication Dial In User Service (RADIUS) Usage Guidelines," Internet Engineering Task Force, Request for Comment 3580, pp. 1-25, Sep. 2003.

R. Droms, et al., "Remote Authentication Dial-In User Service (RADIUS) Attributes Suboption for the Dynamic Host Configuration Protocol (DHCP) Relay Agent Information Option," Internet Engineering Task Force, Request for Comment 4014, pp. 1-7, Feb. 2005.

B. Sterman, et al., "RADIUS Extension for Digest Authentication," Internet Engineering Task Force, Request for Comment 4590, pp. 1-27, Jul. 2006.

D. Nelson, "RADIUS Authentication Client MIB for IPv6," Internet Engineering Task Force, Request for Comment 4668, pp. 1-20, Aug. 2006.

D. Nelson, "RADIUS Authentication Server MIB for IPv6," Internet Engineering Task Force, Request for Comment 4669, pp. 1-21, Aug. 2006.

D. Nelson, "RADIUS Accounting Client MIB for IPv6," Internet Engineering Task Force, Request for Comment 4670, pp. 1-19, Aug. 2006.

D. Nelson, "RADIUS Accounting Server MIB for IPv6," Internet Engineering Task Force, Request for Comment 4671, pp. 1-20, Aug. 2006.

S. DeCnodder, et al., "RADIUS Dynamic Authorization Client MIB," Internet Engineering Task Force, Request for Comment 4672, pp. 1-19, Sep. 2006.

S. DeCnodder, et al., "RADIUS Dynamic Authorization Server MIB," Internet Engineering Task Force, Request for Comment 4673, pp. 1-20, Sep. 2006.

P. Congdon, et al., "RADIUS Attributes for Virtual LAN and Priority Support," Internet Engineering Task Force, Request for Comment 4675, pp. 1-13, Sep. 2006.

V. Mammoliti, et al., "DSL Forum Vendor-Specific RADIUS Attributes," Internet Engineering Task Force, Request for Comment 4679, pp. 1-21, Sep. 2006.

J. Salowey, "RADIUS Delegated-IPv6-Prefix Attribute," Internet Engineering Task Force, Request for Comment 4818, pp. 1-6, Apr. 2007.

B. Aboda, et al., "Extensible Authentication Protocol (EAP)," Internet Engineering Task Force, Request for Comment 3748, pp. 1-67, Jun. 2004.

B. Aboda, et al., "PPP EAP TLS Authentication Protocol," Internet Engineering Task Force, Request for Comment 2716, pp. 1-24, Oct. 1999.

European Patent Office; Communication Pursuant to Article 94(3) EPC; Sep. 8, 2011; issued in European Patent Application No. 08719549.1.

\* cited by examiner

| DEVICE 402 | PRIVILEGE 404 | SERVICES 406 |
|---|---|---|
| FIRST SPEAKERS 110 | PERMANENT | AUDIO OUT |
| WIDE-SCREEN TV 108 | PERMANENT | VIDEO OUT |
| SECOND SPEAKERS 114 | PERMANENT | AUDIO OUT |
| SMALL-SCREEN TV 112 | PERMANENT | VIDEO OUT |
| HOME SERVER 118 | PERMANENT | DATA IN/OUT |
| LAPTOP 116 | TEMPORARY | AUDIO IN/OUT, VIDEO OUT |
| HOME PRINTER 106 | PERMANENT | PRINTED PAPER |
| PROXY SERVER 104 | PERMANENT | DATA IN/OUT |
| CAR 120 | TEMPORARY | VIDEO OUT, AUDIO IN/OUT, KEYPAD IN |
| HOTEL TELEVISION 154 | GUEST, TEMPORARY | AUDIO OUT, VIDEO OUT |
| MOBILE PHONE 152 | PERMANENT | AUDIO IN/OUT, VIDEO OUT |

DEVICE TABLE 400

FIG. 4

| PRIVILEGE TYPE 502 | PERMISSIONS 504 |
|---|---|
| PERMANENT | FULL |
| GUEST | NON-CONFIDENTIAL |
| TEMPORARY | LESS THAN ONE HOUR |

PRIVILEGE TABLE 500

PROVIDING SERVICES TO A GUEST DEVICE IN A PERSONAL NETWORK

RELATED APPLICATIONS

This patent application claims priority under 35 U.S.C. §119 to U.S. Provisional Application No. 60/969,681, filed Sep. 3, 2007, the disclosure of which is incorporated herein by reference.

BACKGROUND

1. Technical Field

Embodiments described herein may relate generally to providing services by devices associated with a personal network and may relate, more particularly, to providing services by a personal network to a mobile device.

2. Description of Related Art

Devices coupled to a network may provide a myriad of services. For example, a home network may include a device to play music (e.g., a stereo), display videos (e.g., a television), print documents, store data (such as video or music), or retrieve data. Current technology does not provide adequate management of the services that these devices provide to users.

SUMMARY

In one aspect, a system may include a personal network; a mobile communications device including a transmitter to send authentication credentials and connection information for the personal network to a guest device for accessing the personal network; the personal network may include a proxy, the proxy may include: a receiver to receive the authentication credentials from the guest device; and a processor to authenticate the guest device based on the authentication credentials received from the guest device and to authorize the guest device to access content stored in the personal network for a guest session.

In one aspect, the authentication credentials are first authentication credentials, and the transmitter of the mobile communications device may transmit second authentication credentials to the guest device.

In one aspect, the first authentication credentials include information indicative of a first expiration time, and the processor of the proxy re-authenticates the guest device based on the second authentication credentials after a time based on the first expiration time.

In one aspect, the second authentication credentials include a second expiration time after which the second authentication credentials are not valid.

In one aspect, the proxy limits access to content by the guest device based on privilege information stored in the proxy.

In one aspect, the mobile communications device transmits the privilege information to the proxy.

In one aspect, the mobile communications device may include a processor to generate the authentication credentials.

In one aspect, the transmitter of the mobile communications device includes one or more of a short-range communications transmitter or a near field communication transmitter.

In one aspect, the processor of the proxy may further be configured to generate the authentication credentials.

In one aspect, the proxy may further include a transmitter to send the authentication credentials to the mobile communications device.

In one aspect, the transmitter of the mobile communications device may be further configured to send connection information about the guest device to the proxy.

In one aspect, a method may include sending connection information about a personal network from a mobile communications device to a guest device; and sending authentication credentials from the mobile device to the guest device, where the authentication credentials may be used to authenticate the guest device in the personal network and authorize the guest device to access content stored in the personal network for a guest session.

In one aspect, the method may further include generating the authentication credentials in the mobile communications device.

In one aspect, the method may include sending privilege information from the mobile device to a proxy, where the privilege information is used to limit access to content by the guest device.

In one aspect, the authentication credentials are first authentication credentials, and the mobile communications device may transmit second authentication credentials to the guest device.

In another aspect, the first authentication credentials may include information indicative of a first expiration time and the second authentication credentials may be used to re-authenticate the guest device in the personal network after a time based on the first expiration time.

In one aspect, the second authentication credentials may include information indicative of a second expiration time after which the second authentication credentials are not valid.

In one aspect, transmitting the authentication credentials may include transmitting the authentication credentials with a short-range communication transmitter or a near field communication transmitter.

In one aspect, the method may further include receiving the authentication credentials from a proxy in the personal network.

In one aspect, the method may further include sending connection information about the guest device to the proxy in the personal network.

In one aspect, a mobile communications device may include a transmitter to send first authentication credentials and connection information for a personal network to a guest device; where the first authentication credentials may be used to authenticate the guest device in the personal network and authorize the guest device to access content stored in the personal network for a guest session; and where the transmitter may send second authentication credentials to the guest device to re-authenticate the guest device in the personal network.

In one aspect, the first authentication credentials may include information indicative of a first expiration time and the guest device may be re-authenticated based on the second authentication credentials after a time based on the first expiration time.

In one aspect, the mobile communications device may include a processor to generate the authentication credentials.

In one aspect, the transmitter of the mobile communications device may include a short-range communication transmitter or a near field communication transmitter.

In one aspect, the mobile communications device may include a receiver to receive the first authentication credentials from a proxy in the personal network.

In one aspect, the transmitter may be further configured to send connection information about the guest device to the proxy.

BRIEF DESCRIPTION OF THE DRAWINGS

The accompanying drawings, which are incorporated in and constitute a part of this specification, illustrate one or more embodiments and, together with the description, explain the embodiments. In the drawings.

FIG. 4 is a block diagram of an exemplary device table;

FIG. 5 is a block diagram of an exemplary privilege table;

DETAILED DESCRIPTION

The following detailed description refers to the accompanying drawings. The same reference numbers in different drawings may identify the same or similar elements. Also, the following detailed description does not limit the scope of the claims. Rather, the claims and their equivalents define the scope of the inventions described herein.

Overview

Embodiments described herein allow users to define a personal network. A personal network is a collection of devices that provide services to users. Services may include playing music or movies, viewing pictures, printing documents, storing movies and music, among other things. The devices associated with the personal network and the services that these devices provide to the users may be defined. Further, the devices allowed to access the services and devices may have limited privileges or permissions to access the devices and services. For example, a guest to a personal network may not have full access to the devices and services associated with the personal network.

Exemplary Personal Network

Figure 1:
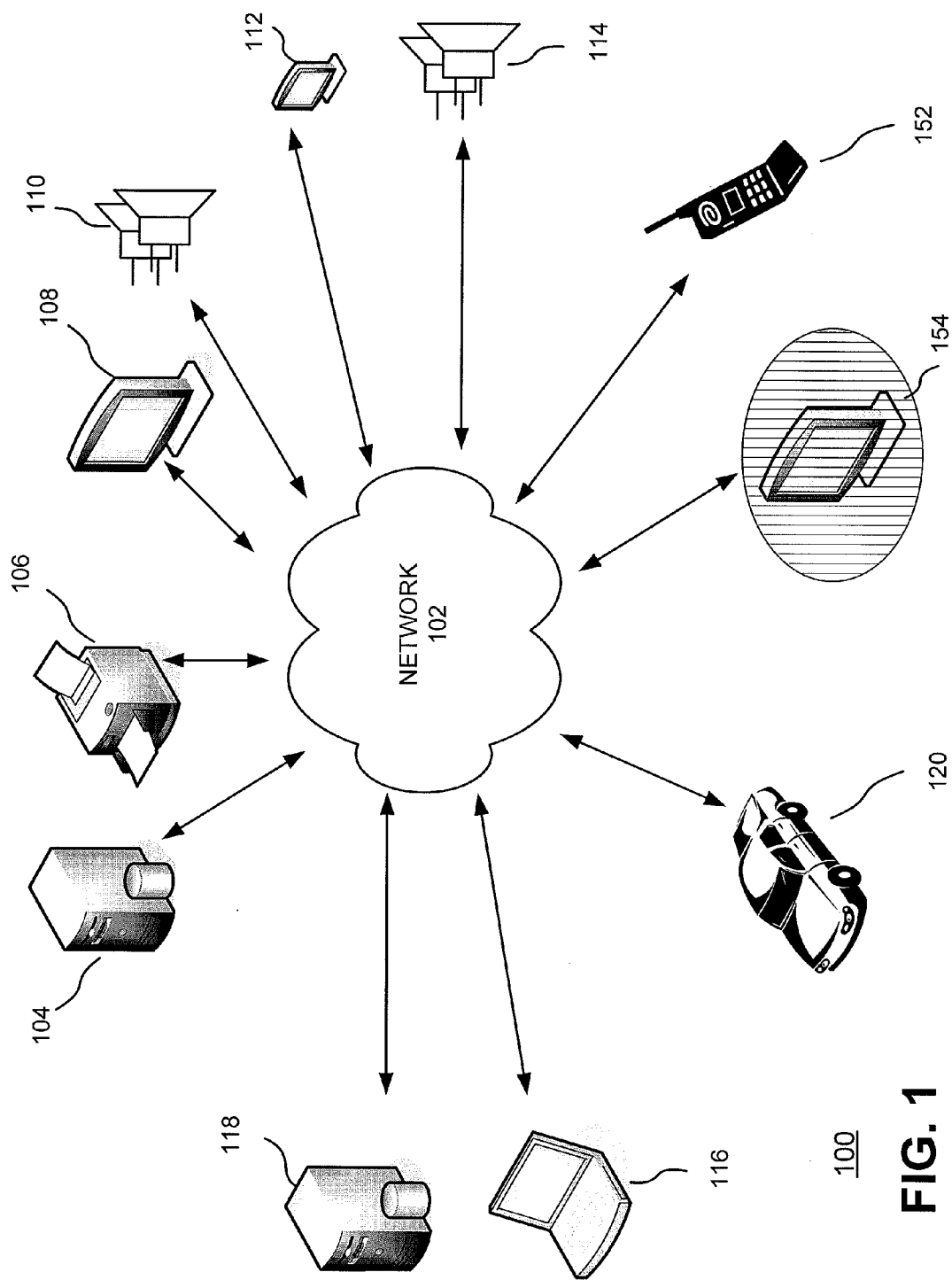
FIG. 1 shows an exemplary personal network for embodiments described herein.

FIG. 1 shows an exemplary personal network 100 in which embodiments described herein may be implemented. As shown, personal network 100 may include a network 102 communicating with a group of devices 104-154. These devices may include, among other things, a proxy server 104, a home printer 106, a wide-screen TV 108 (e.g., a display or monitor), a first pair of speakers 110 (first speakers 110), a small-screen TV 112 (e.g., a display or monitor), a second pair of speakers 114 (second speakers 114), a laptop 116, a home server 118, a car 120, a mobile phone 152, and a hotel television (hotel TV) 154. In other embodiments, personal network 100 may include more, fewer, or different components. Moreover, one or more devices 104-154 associated with personal network 100 may perform one or more functions of any other device of personal network 100. Furthermore, one or more of devices 104-154 may be remotely located from each other. Although FIG. 1 shows devices 104-154 coupled to network 102, devices 104-154 may also be coupled with each other and may be able to communicate directly with each other.

Besides the devices shown in FIG. 1 coupled to network 102, coupled devices may include any computational device, including among other things: a camcorder, a personal computer; a telephone, such as a radio telephone; a personal communications system (PCS) terminal that may combine a cellular radiotelephone with data processing, facsimile, and/or data communications capabilities; an electronic notepad; a personal music player (PMP); a personal digital assistant (PDA) that may provide Internet/intranet access, web browser, organizer, calendar, and a global positioning system (GPS). In one embodiment, personal network 100 may include a DNLA (Digital Network Living Alliance) network.

Network 102 may include the Internet, an ad hoc network, a local area network (LAN), a wide area network (WAN), a metropolitan area network (MAN), a cellular network, a public switched telephone network (PSTN), any other network, or combinations of networks. Network 102 may include wireless and/or wired networks or sub-networks.

Home server 118 and proxy server 104 may include one or more computer systems for hosting server programs, databases, and/or applications. Home server 118 may receive a request for uploading or downloading data from other devices, such as devices coupled to personal network 100, process the request, and transmit or receive data to and from other devices, such as devices coupled to personal network 100. Proxy server 104 may authenticate devices connecting to personal network 100, e.g., making sure devices and users connecting to personal network 100 are indeed supposed to be able to connect to personal network 100. Authenticating a device may be considered creating a security association (SA) between the device and personal network 100. In addition, proxy server 104 may also authorize those authenticated devices and users, e.g., making sure devices and users only do what they are supposed to be doing on personal network 100. Proxy server 104 and home server 118 may be located in a home of a user, but proxy server 104 may be located elsewhere (e.g., remotely from home server 118). In one embodiment, proxy server 104 and home server 118 may be the same device. In one embodiment, proxy server 104 may be a process, program, or application running in server 118.

Printer 106 may include any black and white or color printer, such as a laser printer, ink-jet printer, dot matrix printer, etc. Wide-screen display 108, small-screen display 112, and hotel TV 154 may include a liquid crystal display (LCD), a cathode ray tube (CRT), a plasma display, etc. Hotel TV 154 is shown behind bars because, as described below, hotel TV 154 may have limited or temporary access to personal network 100 through, for example, proxy server 104. First speakers 110 and second speakers 114 may include one or more speakers that output audio signals, such as stereo or mono audio. Laptop 116 may include any portable computing device, PDA, PMP, etc. Mobile phone 152 may include any portable computing device, PDA, PMP, etc. Car 120 may include any mobile transportation device, automobile, truck, etc.

Exemplary Environment

Figure 2:
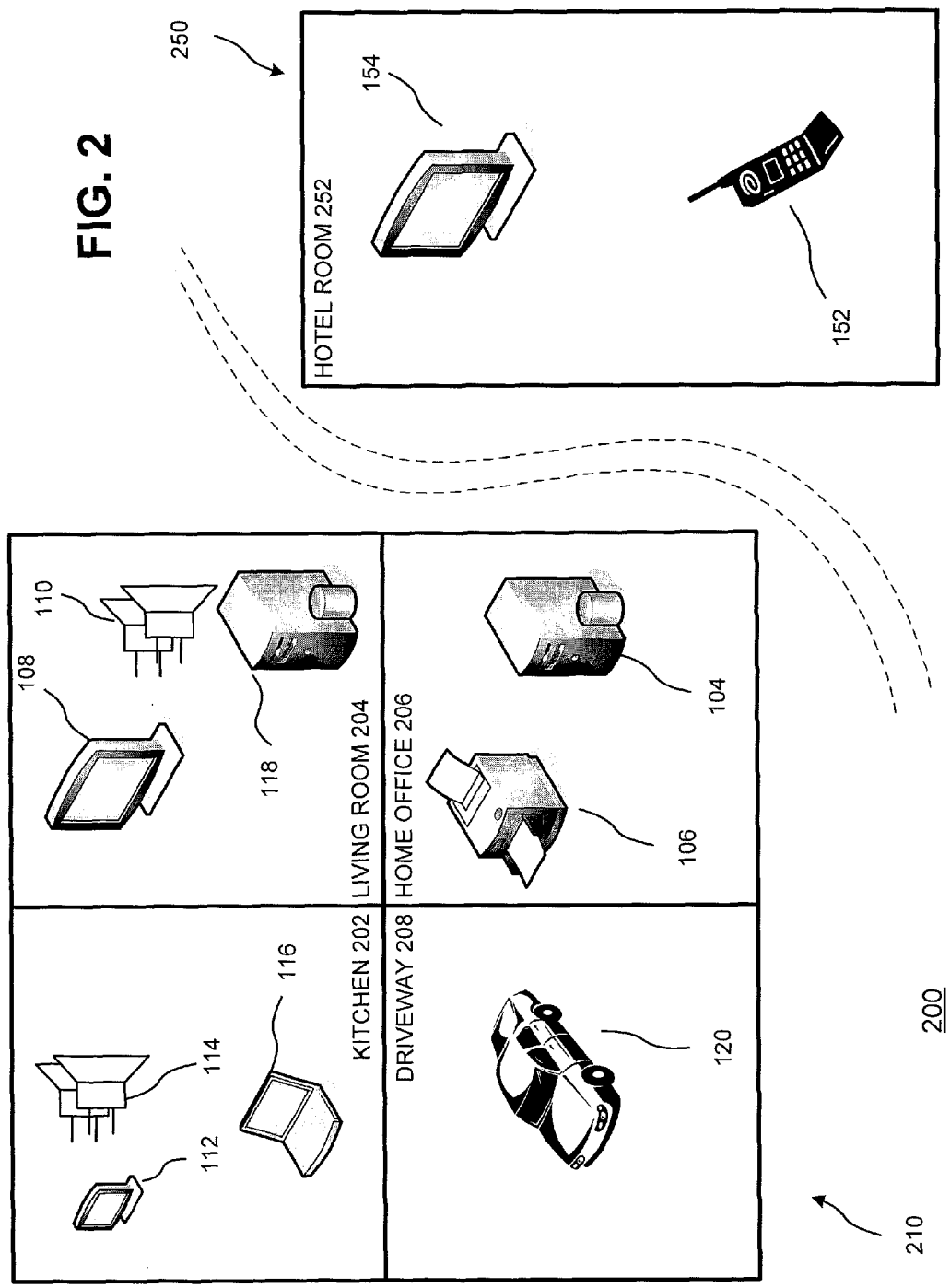
FIG. 2 shows an exemplary environment for embodiments described herein.

FIG. 2 is a diagram of an exemplary environment 200 in which embodiments disclosed herein may be implemented. Environment 200 may include a home environment 210 and a foreign environment 250. Environment 200 may include more, fewer, or different environments than shown in FIG. 2. As shown in FIG. 1, home environment 210 and foreign environment 250 may be coupled together through network 102. In one embodiment, the Internet connects home environment 210 with foreign environment 250. Home environment 210 and foreign environment 250 may include more, fewer, or different locations and/or device other than those shown in FIG. 2.

Home environment 210 may include a kitchen 202, a living room 204, a home office 206, and a driveway 208. In exemplary environment 200, kitchen 202 may include laptop 116, small-screen TV 112, and second speakers 114; living room 204 may include home server 118, wide-screen TV 108, and first speakers 110; home office 206 may include proxy server 104 and home printer 106; driveway 208 may include car 120.

Foreign environment 250 may include a hotel room 252. Hotel room 252 may include a hotel TV 154. Foreign environment 250 may also include mobile phone 152, which may be there by virtue of its user staying in hotel room 252 for a period of time.

Home environment 210 may be considered a trusted environment while foreign environment 250 may be considered an untrusted environment. In addition, in one embodiment, hotel TV 154 in foreign environment 250 may be considered an untrusted device.

Exemplary Device

Figure 3:
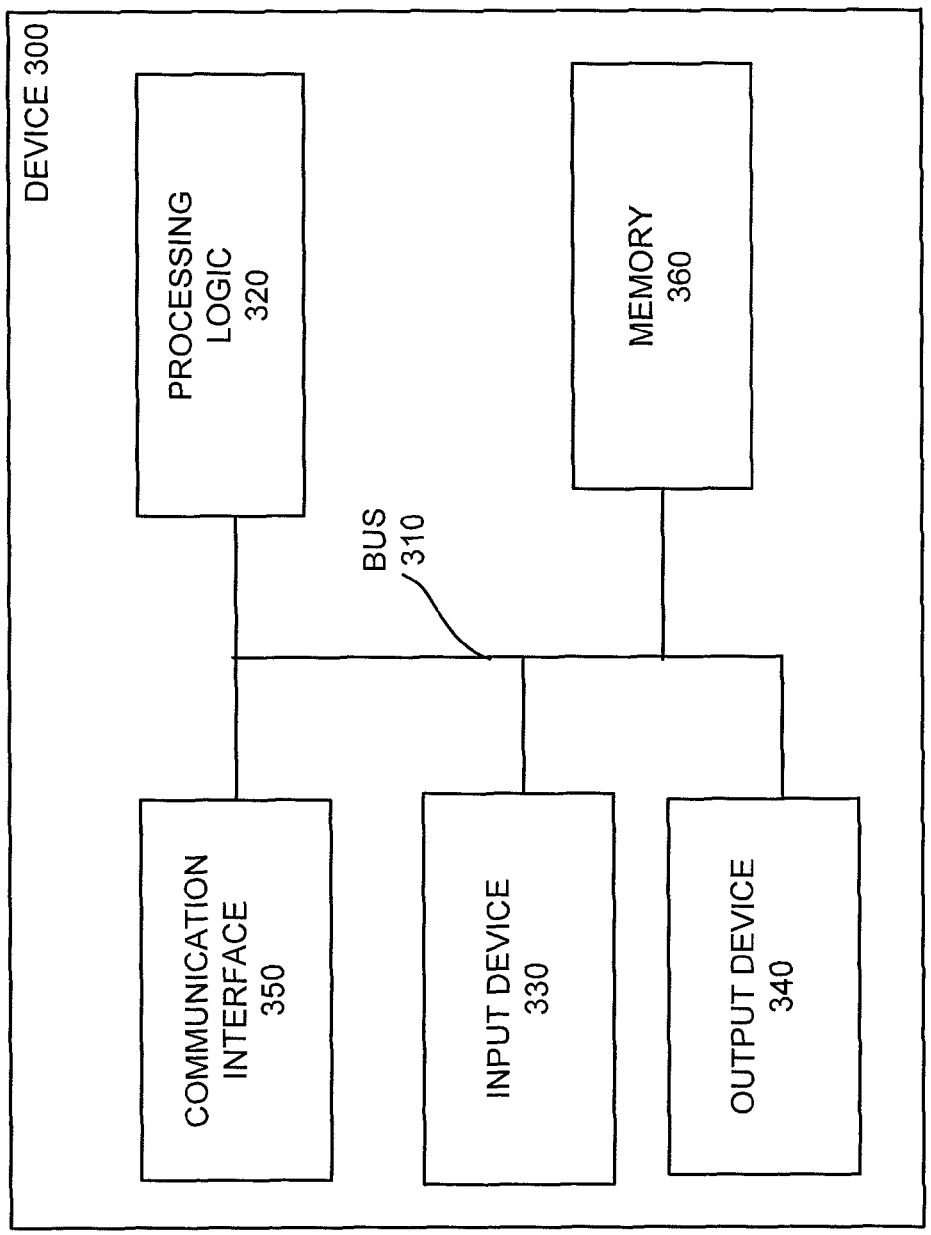
FIG. 3 is a block diagram of exemplary components of a device.

FIG. 3 is a block diagram of exemplary components of a device, such as any one of devices 104-154. Device 300 may include a bus 310, processing logic 320, an input device 330, an output device 340, a communication interface 350, and a memory 360. Device 300 may include other components (not shown) that aid in receiving, transmitting, and/or processing data. Moreover, other configurations of components in device 300 are possible. Further, one or more components of device 300 may be remotely located.

Bus 310 may include a path that permits communication among the components of device 300. Processing logic 320 may include any type of processor or microprocessor (or groups of processors or microprocessors) that interprets and executes instructions. In other embodiments, processing logic 320 may include an application-specific integrated circuit (ASIC), a field-programmable gate array (FPGA), or the like.

Input device 330 may include a device that permits a user to input information into device 300, such as a keyboard, a keypad, a mouse, a pen, a microphone, a remote control, a touch-screen display, one or more biometric mechanisms, or the like.

Output device 340 may include a device that outputs information to the user, such as a display, a printer, a speaker, etc. Output device 340 may include a vibrator to alert a user.

Input device 330 and output device 340 may allow the user of device 300 to receive a menu of options. The menu may allow the user to select various functions or services associated with applications executed by device 300 or other devices coupled to network 102. Input device 330 and output device 340 may allow the user to activate a particular service or application, such as a service defined by a device table described below.

Communication interface 350 may include any transceiver-like mechanism that enables device 300 to communicate with other devices and/or systems. Communication interface 350 may include a transmitter that may convert baseband signals from processing logic 320 to radio frequency (RF) signals and/or a receiver that may convert RF signals to baseband signals. Alternatively, communication interface 350 may include a transceiver to perform functions of both a transmitter and a receiver. Communication interface 350 may be coupled to an antenna for transmission and reception of the RF signals. Communications interface 350 may include a network interface card, e.g., Ethernet card, for wired communications or a wireless network interface (WiFi) card for wireless communications.

Communications interface 350 may include global satellite navigation and positioning system receiver for assisting in the determination of the location of the respective device. Communication interface 350 may also include, for example, a universal serial bus (USB) port for communications over a cable, a short-range communications device (e.g., a Bluetooth wireless interface or WiFi), a near-field communication (NFC) device, etc. Communication interface 350, for example, may send signals, such as Bluetooth signals and/or electromagnetic signals, to other devices within a vicinity of the device 300, such as within 1 centimeter, within 10 centimeters, within 1 meter, within 10 meters, within 15 meters, within 20 meters, within 25 meters, or within 30 meters, for example. Communications device 350 may receive, transmit and/or process digital or analog audio inputs/outputs and/or digital or analog video inputs/outputs.

Memory 360 may include a random access memory (RAM) or another type of dynamic storage device that may store information and instructions, e.g., an application, for execution by processing logic 320; a read-only memory (ROM) device or another type of static storage device that may store static information and instructions for use by processing logic 320; and/or some other type of magnetic or optical recording medium and its corresponding drive, e.g., a hard disk drive (HDD), for storing information and/or instructions.

Device 300 may perform certain operations, as described in detail below. Device 300 may perform these operations in response to processing logic 320 executing software instructions contained in a computer-readable medium, such as memory 360. A computer-readable medium may be defined as a physical or logical memory device and/or carrier wave. The software instructions may be read into memory 360 from another computer-readable medium or from another device via communication interface 350. The software instructions contained in memory 360 may cause processing logic 320 to perform processes that are described below.

Exemplary Data Structures

FIG. 4 is a block diagram of an exemplary device table 400. Device table 400, e.g., a database, may define the devices associated with a personal network, such as personal network 100, the privileges associated with the devices, and the services the devices may provide. Device table 400 may be stored, for example, in memory 360 of device 300, or in a memory of any device coupled to personal network 100. In one embodiment, device table 400 may be stored in memory 360 of proxy server 104 or home server 118. In one embodiment, portions of device table 400 may be stored in various devices coupled to personal network 100. Device table 400 may include a device field 402, a privilege field 404, and a services field 406. Device table 400 may include additional, different, or fewer fields than illustrated in FIG. 4.

Device field 402 may include the name of a device associated with personal network 100. In exemplary device table 400, the devices 104-154 associated with personal network 100 of FIG. 1 are listed in eleven records (records 452 through 472).

Privilege field 404 may include the name of a set of privileges afforded the corresponding device in device field 402. Exemplary device table 400 lists three different privilege types, including GUEST, TEMPORARY, and PERMANENT. The privileges (e.g., permissions) associated with these privilege types may be defined in a privilege table described below with respect to FIG. 6. In exemplary device table 400, the privileges of devices 104-154 are listed in privilege field 404 of the eleven records (records 452 through 472).

Services field 406 may include the services that the device in the corresponding device field 402 may provide. In exemplary device table 400, services of devices 104-154 are listed in services field 406 of the eleven records (records 452 through 472). Exemplary services may include, among others, audio output (e.g., a speaker playing music), video output (e.g., a monitor displaying a video), printed paper (e.g., a printer outputting paper), audio input (e.g., a microphone), and a keypad input. Other services not shown in FIG. 4, device table 400, are possible.

As indicated in exemplary device table 400: first speakers 110 may be have a privilege of PERMANENT and its services may include outputting audio (record 452); wide-screen TV 108 may have a privilege of PERMANENT and its services may include outputting video (record 454); second speakers 114 may have a privilege of PERMANENT and its services may include outputting audio (record 456); small-screen TV 112 may have a privilege of PERMANENT and its services may include data input and output outputting video (record 458); home server 118 may have a privilege of PERMANENT and its services may include inputting and outputting data (record 460); laptop 116 may have a privilege of TEMPORARY and its services may include outputting video and audio and inputting audio (record 462); home printer 106 may have a privilege of PERMANENT and its services may include printing paper (record 464); proxy server 104 may have a privilege of PERMANENT and its services may include inputting (e.g., receiving, storing) and outputting (e.g., retrieving, displaying) data (record 466); car 120 may have a privilege of TEMPORARY and its services may include outputting video and audio, inputting audio, and inputting user data from a keypad (record 468); hotel TV may have privileges of GUEST and TEMPORARY and its services may include outputting video and audio (record 470); and mobile phone 152 may have privileges of PERMANENT and its services may include outputting audio and video and inputting audio (record 472).

Devices and/or services may be added or removed from personal network 100, for example, by adding, removing, or editing entries in device table 400. Such editing of device table 400 may be done, for example, through laptop computer 116 or automatically by proxy server 104.

FIG. 5 is a block diagram of an exemplary privilege table 500. Privilege table 500, e.g., a database, may define the set of privileges (e.g., permissions) afforded each privilege type. Privilege table 500 may be stored in memory 360 of device 300, e.g., a memory of any device coupled to network 102, among other places. In one embodiment, privilege table 500 may be stored in memory 360 of proxy server 104 or home server 118. Privilege table 500 may include a privilege type field 502 and a permissions field 504. Privilege table 500 may include additional, different, or fewer fields than illustrated in FIG. 5.

Privilege type field 502 may include the name of the privilege type. The name(s) listed in this field may correspond to the privileges afforded devices in device table 400. Exemplary privilege table 500 may include three roles: GUEST, TEMPORARY, and PERMANENT. These roles are the same privileges listed in device table 400 described above with respect to FIG. 4.

Permissions field 504 may include the permissions afforded the privilege type in the corresponding privilege type field 502. Permissions field 504 may include rules that devices having the corresponding privilege type may have to obey. For example, a permissions field 504 including NON-CONFIDENTIAL may indicate permission to access only files that are not tagged as confidential. A permissions field 504 including a time period (e.g., LESS THAN ONE HOUR) may indicate that a device must authenticate itself with personal network 100 at least once during that time period (e.g., an hour) or that credentials used for authenticating the device will be set to expire after that time period. In this latter example, the device may request new credentials before expiration of the time period. A permissions field 504 including FULL may indicate permissions to access all devices and all documents.

Permissions field 504 may also provide other limitations to permissions, such as the time of day access may be allowed. For example, a permissions field 504 including 1500-1800 may indicate permission to access the services of wide-screen TV 108 between the hours of 1500 and 1800. Permissions may be indicated negatively, e.g., by indicating what permissions are not allowed. For example, a permission of NOT laptop 116 may indicate that a lack of permission to access the services of laptop 116 or data on laptop 116. In one embodiment, permissions may also be limited to particular services provided by devices.

In exemplary privilege table 500, devices with the privilege type PERMANENT are provided the permission of FULL (record 554). Devices with the privilege type GUEST may be provided the permission of NON-CONFIDENTIAL (record 556). Devices with the privilege type TEMPORARY may be provided the permission of LESS THAN ONE HOUR (record 560).

The privileges afforded users with particular roles may be changed, for example, by adding, removing, or editing entries in privilege table 500. Such editing of privilege table 500 may be done, for example, through laptop computer 116 or automatically by proxy server 104.

Exemplary Processeses

Figure 6:
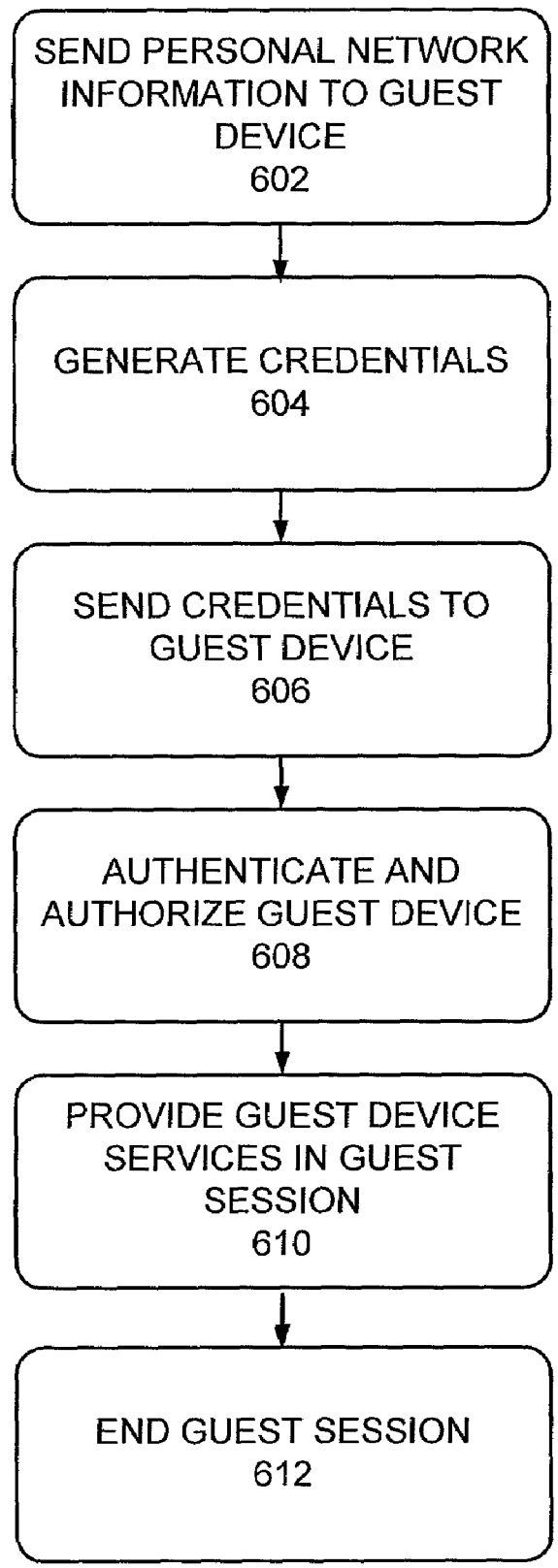
FIGS. 6, 8, 9, and 10 are flowcharts of exemplary processes for providing services in embodiments described herein.

FIG. 6 is a flowchart of an exemplary process 600 for one embodiment for authenticating and authorizing a guest device. In one embodiment, process 600 may be performed by mobile phone 152, hotel TV 154, proxy server 104, and home server 118. Process 600 is described with respect to FIG. 7, which shows the flow of information between devices.

Process 600 may begin when the user of mobile phone 152 enters hotel room 252 and wants to use hotel TV 154 to view content from personal network 100, e.g., video content from home server 118. Hotel TV 154, however, may not be part of personal network 100 and, as such, may not have access to content in home server 118. The user of mobile phone 152 (as a master device) may wish to include hotel TV 154 in personal network 100 (as a guest device) so that hotel TV 154 may play content from personal network 100, for example, during a guest session. A guest session may include a lasting connection between the guest device and personal network 100 for streaming music or video, for example.

Information about a personal network may be sent to a guest device (block 602). For example, mobile phone 152 may send information regarding personal network 100 to hotel TV 154. Such information may include the Internet protocol (IP) address of proxy server 104. Credentials may be generated (block 604). Mobile phone 152 may generate credentials that may allow hotel TV 154 to be authenticated by proxy server 104. In one embodiment, the credentials required by hotel TV 154 may already exist in mobile phone

152. Credentials may include a certificate, such as an asymmetric encryption certificate. Credentials may be time varying, such as a numerical key generated by a time-varying algorithm in mobile phone 152. The credentials may also include information regarding the privileges (e.g., GUEST, TEMPORARY, etc.) that should be afforded the guest device, e.g., hotel TV 154.

Figure 7:
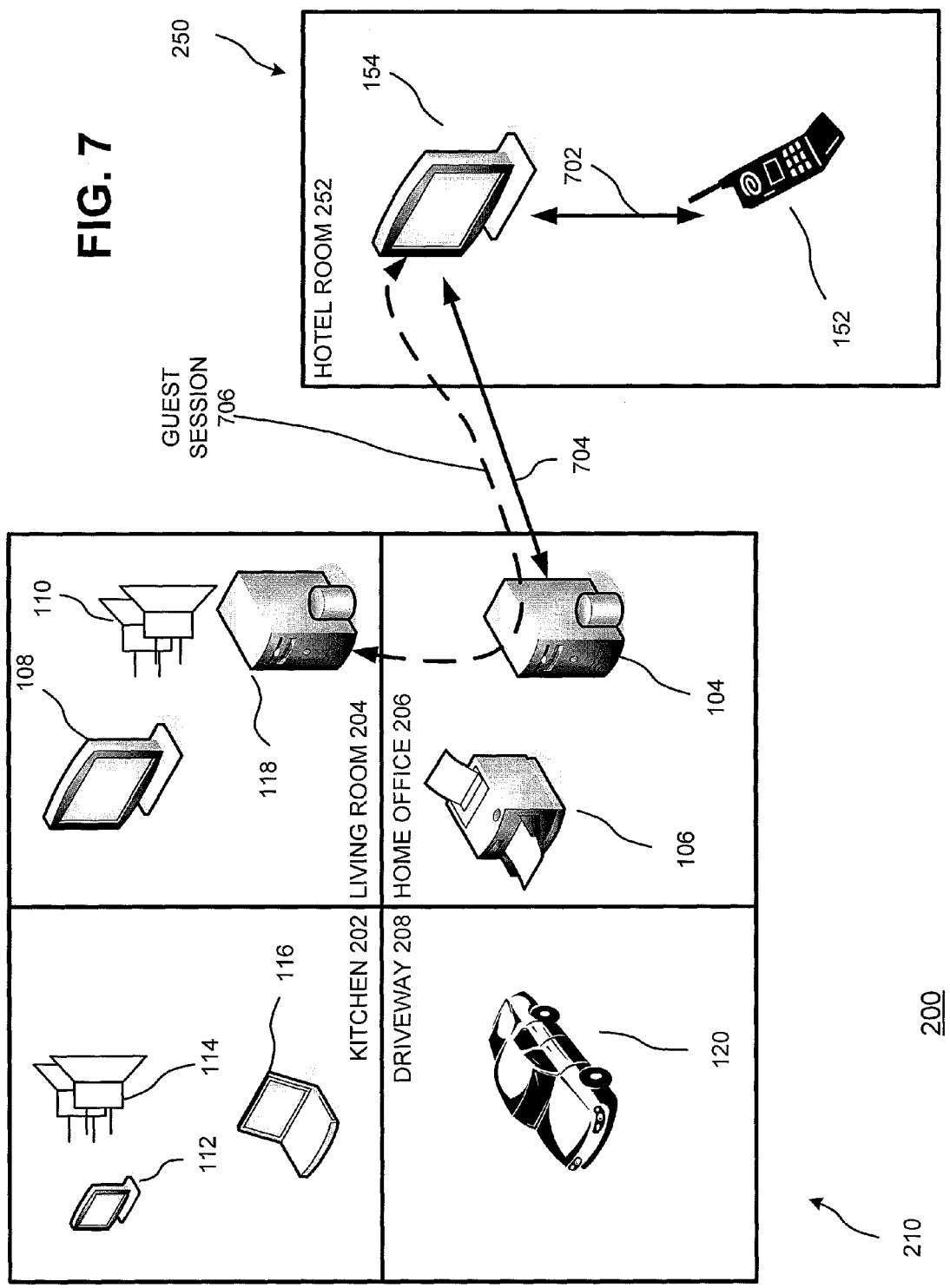
FIGS. 7 and 11 are block diagrams of exemplary environments for embodiments described herein.

Credentials may be sent to the guest device (block 606). In this example, mobile phone 152 may send the credentials generated at block 604 to hotel TV 154 via link 702 so that hotel TV 154 may access personal network 100. Mobile phone 152 may use NFC, Bluetooth, WiFi, a cable, a WLAN, etc. As shown in FIG. 7, the credentials may be sent from mobile phone 152 to TV 154 via a link 702.

Using the credentials and information about personal network 100, the guest device may be authenticated and authorized to access personal network 100 (block 608). Having received the credentials from mobile phone 152 and having the connection information for proxy server 104, hotel TV 154 may communicate with proxy server 104 via a link 704 to be authenticated. Having been authenticated, the guest device may be authorized to access personal network 100 and may provide services (block 610) during a guest session 706. Hotel TV 154 may access video content from home server 118 for the user of mobile phone 152 to watch, for example.

Access by hotel TV 154 to personal network 100 may be limited, however. Hotel TV 154 may be granted GUEST privileges in accordance with device table 400 (record 470). Device table 400, e.g., record 470, may be generated before the user of mobile phone 152 visits foreign environment 250 or may be generated using other information gathered by personal network 100 (e.g., location of mobile phone 152, identification of hotel TV 154 during authentication, general rules, etc). Device table 400, e.g., record 470 may also be generated based on information received from the user of mobile phone 152 when visiting foreign environment 250. For example, when in foreign environment 250, the user of mobile phone 152 may instruct mobile phone 152 to provide information to personal network 100 so that hotel TV 152 will be given GUEST privileges. With GUEST privileges, hotel TV 154 may only access non-confidential information (e.g., information that does not include personal financial information) from personal network 100 pursuant to privilege table 500. In one embodiment, hotel TV 154 may also be limited to accessing only information that matches the services listed for hotel TV in device table 400. That is, hotel TV may only provide audio out and video out related services, for example.

Authentication and access by the guest device may be canceled (block 612) and the guest session may be ended. At some point, the user of mobile phone 152 may end the guest session for hotel TV 154 by communicating with hotel TV 154 and requesting an end to guest session 706, for example.

Figure 8:
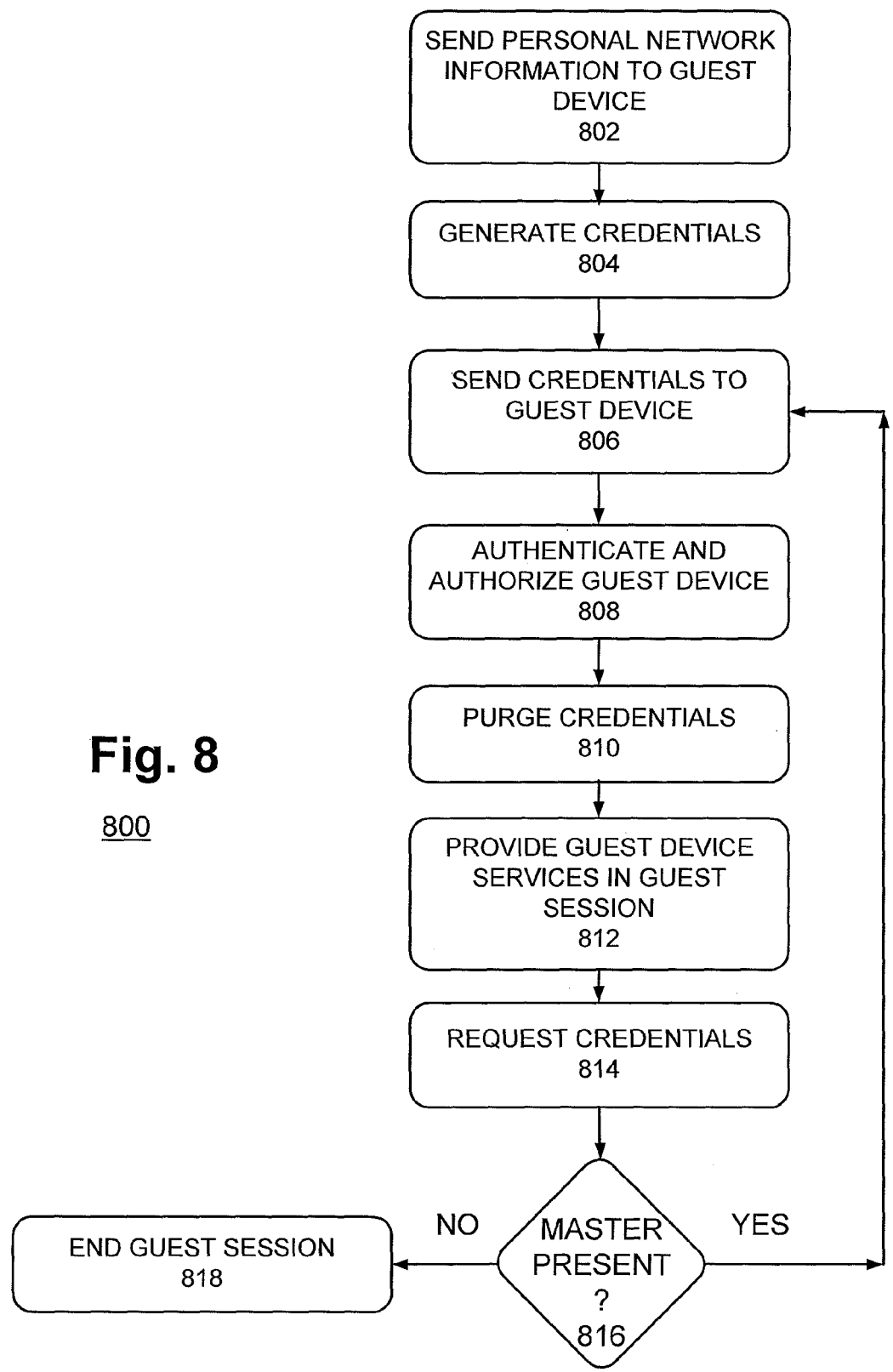
Figure 9:
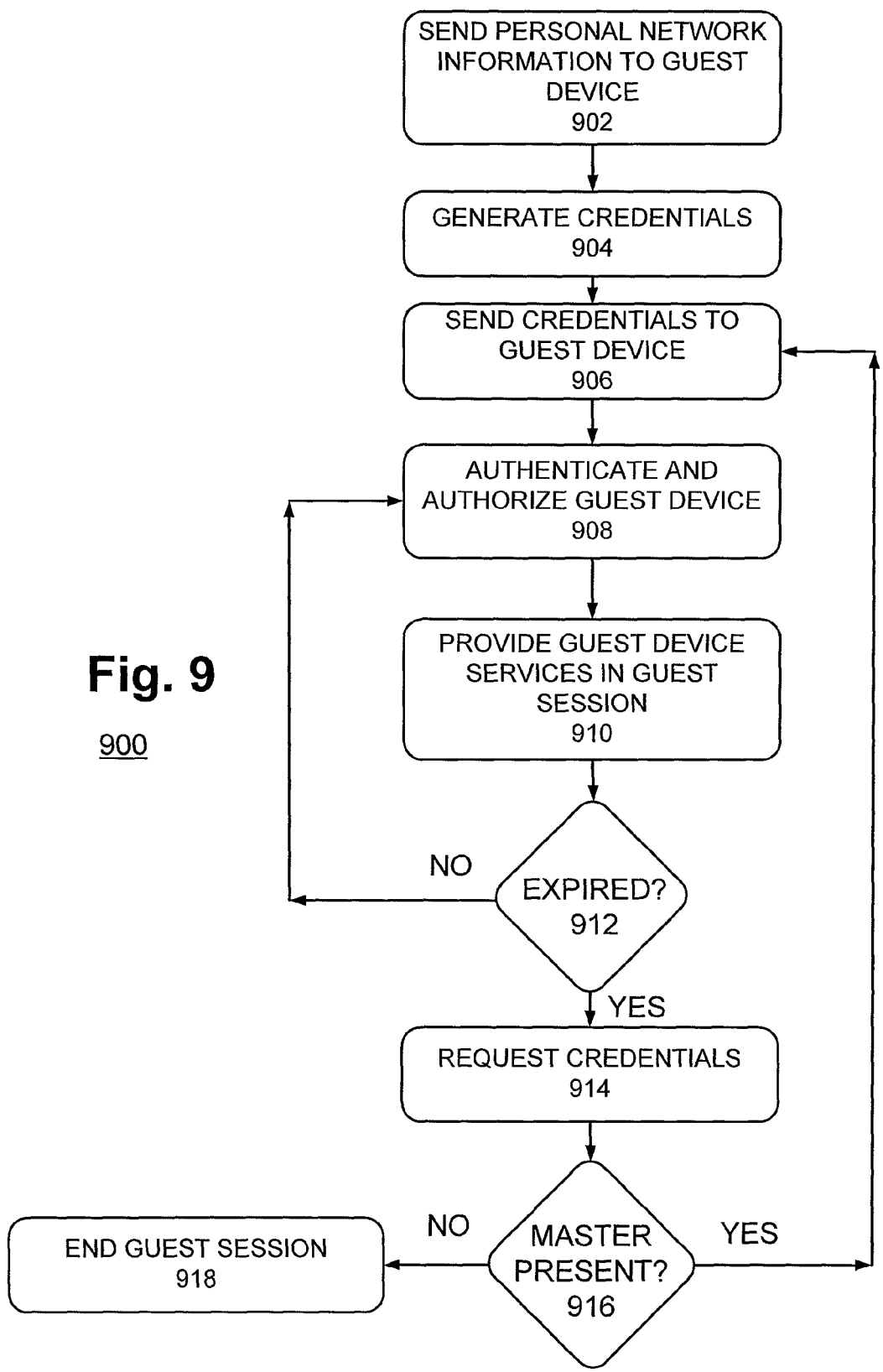

The user of mobile phone 152 may want the access by hotel TV 154, e.g., the guest session, to be temporary, however, because the user may not want the next occupant of hotel room 252 to have access to personal network 100 through hotel TV 154 and the user may forget to end guest session 706. FIGS. 8 and 9 address this scenario in which an absent-minded user forgets to end a session.

FIG. 8 is a flowchart of another exemplary process 800 for one embodiment for authenticating and authorizing a guest device. Like process 600, process 800 may begin when the user of mobile phone 152 enters hotel room 252 and wants to use hotel TV 154 to view content from personal network 100, e.g., video content from home server 118. Hotel TV 154, however, may not be part of personal network 100 and, as such, may not have access to content in home server 118.

Information about personal network 100 may be sent to the guest device (block 802). Similar to process 600, mobile phone 152 may send information regarding personal network 100 to hotel TV 154 via link 702. Such information may include the IP address of proxy server 104. Credentials may be generated (block 804). Mobile phone 152 may generate credentials that may allow hotel TV 154 to be authenticated by proxy server 104. The credentials may also include information regarding the privileges (e.g., GUEST, TEMPORARY, etc.) that should be afforded the guest device, e.g., hotel TV 154 for privilege table 500. In this example, the information regarding the privileges may be encrypted or otherwise unalterable by hotel TV 154. The generated credentials may be sent to the guest device (block 806). In this example, mobile phone 152 may send the credentials generated at block 804 to hotel TV 154 via link 702 so that hotel TV 154 may access personal network 100.

Using the credentials and the information regarding personal network 100, the guest device may be authenticated and authorized to access personal network 100 (block 808). As described above with respect to process 600, having received the credentials from mobile phone 152 and having the connection information for proxy server 104, hotel TV 154 may be authenticated by proxy server 104 via link 704. After authentication, the guest device may purge the credentials (block 810). For example, hotel TV 154 may delete the authentication certificate received from mobile phone 152 at block 806.

Having been authenticated, the guest device may access personal network 100 and personal network 100 may provide services (block 812) during the guest session. For example, hotel TV 154 may then access content from home server 118 for the user of mobile phone 152 to watch, for example, via guest session 706.

Access by hotel TV 154 to personal network 100 may be limited, however. Personal network 100 may, in one embodiment, grant only the privileges to hotel TV 154 indicated in the privilege information received with the credentials from hotel TV 154 (which hotel TV 154 received from mobile phone 152). In addition to GUEST privileges, hotel TV 154 may also be granted TEMPORARY privileges in accordance with device table 400 (record 470). With TEMPORARY privileges, hotel TV 154 may only access personal network 100 for a period of time (e.g., an hour) without re-authentication, for example.

As defined by table 400, therefore, proxy server 104 and/or hotel TV 154 may require re-authentication and re-authorization periodically to continue guest session 706. Because the guest device purged the credentials, the credentials may be requested (or re-requested) by the guest device (block 814). In this example, hotel TV 154 may request the credentials from mobile phone 152 via link 702. If the master device (e.g., mobile phone 152 in this example) is not present (block 816: NO), then the guest session may be ended (block 818) because new credentials cannot be received. In this example, if mobile phone 152 is not present in hotel room 252 and/or hotel TV 154 does not receive credentials from mobile phone 152, then hotel TV 154 and/or proxy server 104 may end guest session 706.

If the master device is present (block 816: YES), then credentials may be resent to the guest device (block 806). In this embodiment, if mobile phone 152 is present, then mobile phone 152 may send credentials to hotel TV 154. In the embodiment where the credentials are time varying, the credentials may be generated again as well (block 804). The guest device may be re-authenticated and re-authorized (block 808). Process 800 may require re-authentication and re-authorization on a periodic basis, such as every minute or every hour, for example.

In one embodiment of process 800, hotel TV 154 may be a trusted device, or at least a partially trusted device, in that it may be trusted to purge credentials. In some situations, however, devices (such as hotel TV 154) may not be trusted to purge credentials. FIG. 9 addresses an untrusted (or a less trusted) device attaching to personal network 100.

FIG. 9 is a flowchart of another exemplary process 900 for one embodiment for authenticating and authorizing a guest device. Like process 600 and 800, process 900 may begin when the user of mobile phone 152 enters hotel room 252 and wants to use hotel TV 154 to view content from personal network 100, e.g., video content from home server 118. Hotel TV 154, however, may not be part of personal network 100 and, as such, may not have access to content in home server 118.

Information about the personal network may be sent to a guest device (block 902). For example, mobile phone 152 may send information regarding personal network 100 to hotel TV 154 via link 702. Such information may include the IP address of proxy server 104. Credentials may be generated (block 904). Mobile phone 152 may generate credentials that may allow hotel TV 154 to be authenticated by proxy server 104. In this example, the credentials may include an expiration date or may be such that an expiration date is understood by proxy server 104. The credentials may also include information regarding the privileges (e.g., GUEST, TEMPORARY, etc.) that personal network 100 should grant to the guest device, e.g., hotel TV 154 for privilege table 500. In this example, the information regarding the privileges may be encrypted or otherwise unalterable by hotel TV 154. The generated credentials may be sent to the guest device (block 906). In this embodiment, mobile phone 152 may send the credentials generated at block 904 to hotel TV 154 via link 702.

Using the credentials and the information about personal network 100, the guest device may be authenticated and authorized to access personal network 100 (block 908). In this example, having received the credentials from mobile phone 152 and having the connection information for proxy server 104, hotel TV 154 may be authenticated by proxy server 104 via link 704. The guest device may access personal network 100 and personal network 100 may provide services (block 910) during the guest session. In this example, after authentication, hotel TV 154 may access content from home server 118 for the user of mobile phone 152 to watch, for example, via guest session 706.

Access by hotel TV 154 to personal network 100 may be limited, however. Personal network 100 may, in one embodiment, grant only the privileges to hotel TV 154 indicated in the privilege information received with the credentials from hotel TV 154 (which hotel TV 154 received from mobile phone 152). In addition to GUEST privileges, hotel TV 154 may also be granted TEMPORARY privileges in accordance with device table 400 (record 470). In one embodiment, TEMPORARY privileges may be defined in privilege table 500 in terms of an expiration time, such as when the credentials for hotel TV 154 expire. In this example, hotel TV 154 may only access personal network 100 until the expiration listed in permissions field 504 of privilege table 500, for example.

Proxy server 104 and/or hotel TV 154 may cancel authentication and access, e.g., end the guest session, when the credentials provided by the guest device expire. In one embodiment, if the credentials have not expired (block 912: NO), the guest device may be re-authenticated and re-authorized to access personal network 100 (block 908). For example, personal network 100 may re-authenticate and re-authorize the guest device for each received packet. If the credentials have not expired (block 912: NO), the guest device may continue to provide services in the guest session (block 910). If the credentials have expired (block 912: YES), the credentials may be requested again by the guest device (block 914). If the master device (e.g., mobile phone 152 in this example) is not present (block 916: NO), then the guest session may be ended (block 918) because new credentials cannot be received. In this example, if mobile phone 152 is not present in hotel room 252 and/or hotel TV 154 does not receive credentials from mobile phone 152, then hotel TV 154 and/or proxy server 104 may end guest session 706.

If the master device is present (block 916: YES), then credentials may be regenerated (block 904) and sent to the guest device again (block 906). In this embodiment, if mobile phone 152 is present, then mobile phone 152 may send credentials to hotel TV 14. The guest device may be re-authenticated and re-authorized (block 908).

Process 900 may require re-authentication and re-authorization on a periodic basis (due to expiring credentials), such as every minute or every hour, for example. In this example, however, guest device may not purge any received credentials. Instead, the credentials provide access for only a period of time.

Figure 10:
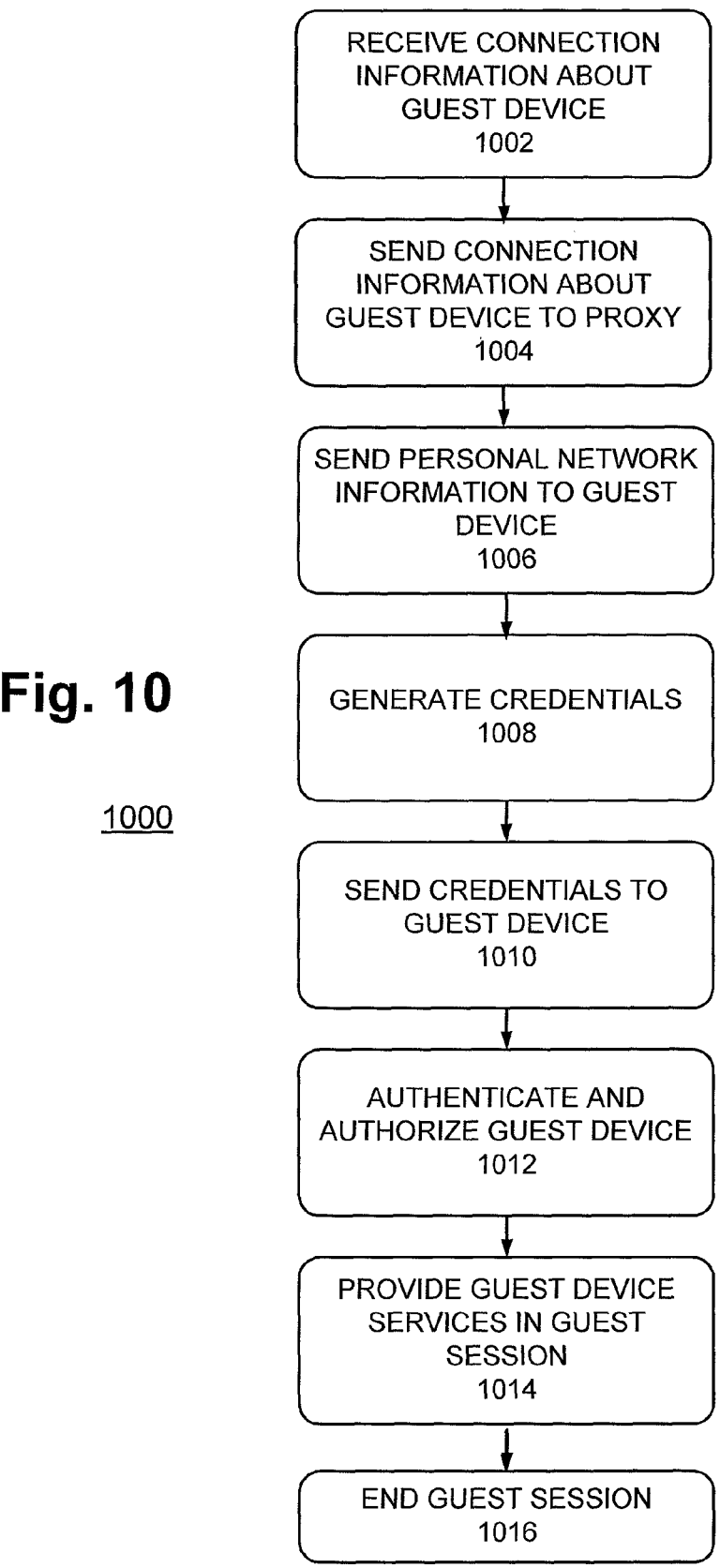
Figure 11:
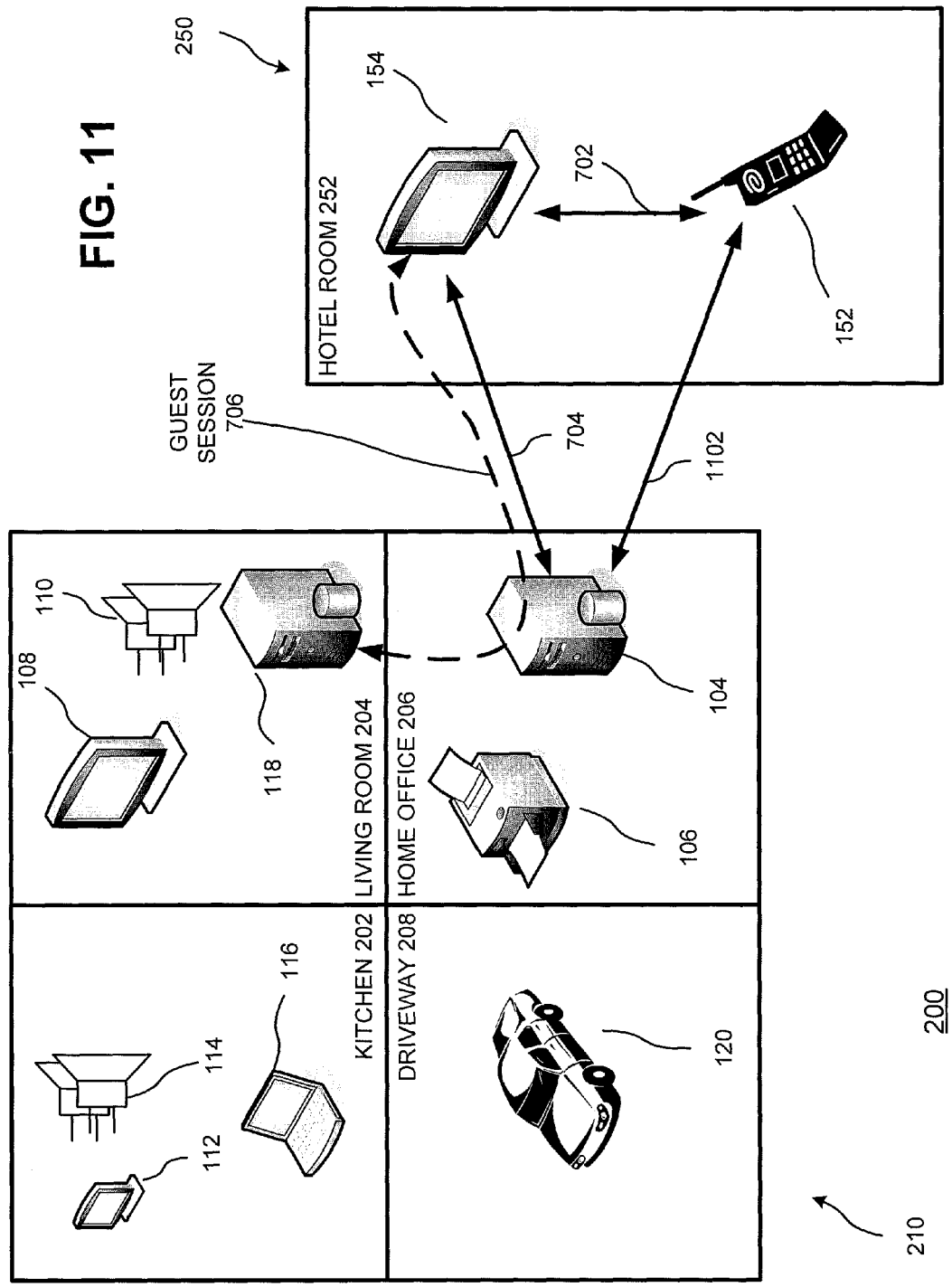

In some cases, common firewalls and NAT (Network Address Translation) routers may impede a proxy server. For example, proxy server 104 (or a firewall associated with proxy server 104) may perform address filtering (e.g., Media Access Card (MAC) or Internet Protocol (IP) address filtering). In this situation, proxy server 104 may require information regarding the guest device. FIG. 10 is a flowchart of an exemplary process 1000 for one embodiment for authenticating and authorizing a guest device. Process 1000 is described below with respect to the signals in FIG. 11.

Like process 600, 800, and 900, process 1000 may begin when the user of mobile phone 152 enters hotel room 252 and wants to use hotel TV 154 to view content from personal network 100, e.g., video content from home server 118. Hotel TV 154, however, may not be part of personal network 100 and, as such, may not have access to content in home server 118.

Connection information may be received from the guest device (block 1002). This information may include the IP address of hotel TV 154, for example, requested by mobile phone 152. Connection information about the guest device may be sent to the proxy server (block 1004). In this case, mobile phone 152 may connect with proxy server 104 via a link 1102 to send the connection information about the guest device. The connection information may also include information regarding the privileges (e.g., GUEST, TEMPORARY, etc.) that should be afforded the guest device, e.g., hotel TV 154, for device table 500. During this connection, mobile phone 152 may also receive credentials from proxy server 104 to establish a guest session between hotel TV 154 and personal network 100. Link 1102 may also be used by proxy server 104 to verify, with mobile phone 152, the adding of the guest device, e.g., hotel TV 154 to personal network 100. In one embodiment, link 1102 may pass through hotel TV 154 and may act as an encrypted channel between mobile phone 152 and proxy server 104.

Information about personal network 100 may be sent to the guest device (block 1006). As with process 600, mobile phone 152 may send information regarding personal network 100 to hotel TV 154 via link 702. Such information may include the IP address of proxy server 104. Credentials may be generated (block 1008). In one embodiment, mobile phone 152 may generate credentials that may allow hotel TV 154 to be authenticated by proxy server 104. In another embodiment, the credentials required by hotel TV 154 may already exist in mobile phone 152. In yet embodiment, the credentials may include the credentials received from home proxy 104 in block 1004. In yet another embodiment, the credentials may include one or more of the above generated or received credentials. In one embodiment, the credentials may also include information regarding the privileges (e.g., GUEST) that should be afforded the guest device, e.g., hotel TV 154 for privilege table 500 if such privilege information was not sent to home proxy in block 1004. Credentials may be sent to the guest device (block 1010). So that hotel TV 154 may access personal network 100, mobile phone 152 may send the credentials to hotel TV 154 via link 702.

Using the credentials and the connection information, the guest device may be authenticated and authorized to access the personal network (block 1012). Having received the credentials from mobile phone 152 and having the connection information for proxy server 104, hotel TV 154 may be authenticated by proxy server 104 via link 704. The guest device may access personal network 100 and may provide services (block 1014) during guest session 706. Hotel TV 154 may then access content from home server 118 for the user of mobile phone 152 to watch, for example. Authentication and access by the guest device may be canceled (block 1016) and the guest session may be ended. For example, at some point, the user of mobile phone 152 may end the guest session for hotel TV 154 by communicating with hotel TV 154 and requesting an end to the guest session. The guest session may end using the methods from any of the processes above.

Process 1000 may be used in combination with processes 600, 800, and 900, and vice versa. For example, the credentials in process 1000 may be purged by hotel TV 154 (as in process 800) or may expire (as in process 900). Communication between mobile device 152 (e.g., a master device) and hotel TV 154 (e.g., a guest device) may take place using a wired connection (such as a USB cable, Ethernet cable, or Internet) or a wireless connection (such as a NFC connection or a short-range communication connection). Mobile device 152 (e.g., a master device) and hotel TV 154 (e.g., a guest device) may be remotely located from each other, e.g., across town, across a continent, etc. Communications between mobile device 152 and hotel TV 154 may also take place over a secure or encrypted connection.

Conclusion

Embodiments described herein allow the authentication of devices in a personal network and allow the control of access to information and/or content in the personal network. Embodiments described herein may allow devices associated with the personal network and the services that these devices provide to the users to be defined. In addition, embodiments described herein may define devices permitted to access the services and content. Further, embodiments described herein may limit the time duration of privileges of devices' access to the personal network.

The foregoing description of embodiments provides illustration and description, but is not intended to be exhaustive or to limit the invention to the precise form disclosed. Modifications and variations are possible in light of the above teachings.

For example, while series of blocks have been described with regard to some figures, the order of the blocks may be modified in other embodiments. Further, non-dependent acts may be performed in parallel.

The term comprises/comprising when used in this specification is taken to specify the presence of stated features, integers, steps or components but does not preclude the presence or addition of one or more other features, integers, steps, components or groups thereof.

It will be apparent that aspects of the invention, as described above, may be implemented in many different forms of software, firmware, and hardware in the embodiments illustrated in the figures. The actual software code or specialized control hardware used to implement aspects consistent with principles of the invention is not limiting of the invention. Thus, the operation and behavior of the aspects were described without reference to the specific software code—it being understood that one would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A system comprising:
a proxy associated with a personal network; and
a mobile communications device associated with the personal network, where the mobile communications device is to:
send personal network connection information to a guest device, the personal network connection information including an internet protocol (IP) address for the proxy;
generate authentication credentials, where the authentication credentials include a type of access granted to the guest device, the type of access including a privilege afforded to the guest device, the afforded privilege comprising at least one of a first privilege to receive output data from the personal network using the guest device or a second privilege to input data to the personal network using the guest device; and
send the authentication credentials to the guest device, where the guest device does not communicate with the proxy until the guest device receives both the personal network connection information and the authentication credentials;
where the proxy is to:
receive the authentication credentials from the guest device, and
authenticate the guest device based on the authentication credentials received from the guest device and authorize the guest device to access content stored in the personal network based at least partially on the type of access granted to the guest device,
where the authentication credentials are first authentication credentials and include information indicative of a first expiration time,
where, prior to the first expiration time, the proxy re-authenticates the guest device based on the first authentication credentials,
where, after the first expiration time, the mobile communications device, in response to receiving a request for credentials from the guest device, generates second authentication credentials and transmits the second authentication credentials to the guest device, where the second authentication credentials include a second expiration time after which the second authentication credentials are not valid, and where, prior to the second expiration time, the proxy re-authenticates the guest device based on the second authentication credentials.

2. The system of claim 1, where the guest device purges the first authentication credentials after the proxy authenticates the guest device.

3. The system of claim 1, where the second authentication credentials are different from the first authentication credentials.

4. The system of claim 1, where the proxy limits access, by the guest device, to content stored on the personal network, based on the privilege afforded to the guest device or privilege information stored in the proxy.

5. The system of claim 1, where, prior to the guest device communicating with the proxy, the mobile communications device is to send connection information about the guest device to the proxy; and receive credentials from the proxy.

6. The system of claim 1, where a transmitter of the mobile communications device includes one or more of a short-range communications transmitter or a near field communication transmitter.

7. The system of claim 6, where the proxy requires information about the guest device in order for the guest device to initiate communication with the proxy.

8. The system of claim 1, where the transmitter of the mobile communications device includes one or more of a short-range communications transmitter or a near field communication transmitter.

9. The system of claim 1, where a first type of access granted to the guest device is guest access such that the guest device has access to files on the personal network that are not tagged as confidential, and where a second type of access granted to the guest device is temporary access such that the guest device is re-authenticated by the proxy at least once during a predetermined period.

10. The system of claim 9, where a third type of access granted to the guest device is full access such that the guest device has access to confidential and non-confidential files on the personal network.

11. A method comprising:
in response to a proxy server in a personal network requiring information about a guest device:
requesting, by a mobile communications device associated with the personal network, connection information from the guest device;
receiving, at the mobile communications device, first connection information about the guest device;
sending, from the mobile communications device, to the proxy server in the personal network, the first connection information about the guest device, where the first connection information is sent via a link that includes the guest device and that acts as an encrypted channel;
sending, by the mobile communications device to the guest device, second connection information about the proxy server in the personal network, the second connection information including an internet protocol (IP) address for the proxy server;
generating, by the mobile communications device, authentication credentials for the guest device;
sending, by the mobile communications device to the guest device, the authentication credentials, where the authentication credentials are used by the proxy server to authenticate the guest device in the personal network and limit the guest device to access, based on a type of access included in the authentication credentials, content stored in the personal network for a guest session, where the guest device does not communicate with the proxy server until the guest device receives both the second connection information and the authentication credentials, the type of access including a privilege afforded to the guest device, the afforded privilege comprising at least one of a first privilege to receive output data from the personal network using the guest device or a second privilege to input data to the personal network using the guest device; and
verifying, by the mobile communications device and via the link, the guest device being added to the personal network,
where the authentication credentials are first authentication credentials and include information indicative of a first expiration time,
where, prior to the first expiration time, the proxy server re-authenticates the guest device based on the first authentication credentials; and
after the first expiration time, in response to receiving a request for credentials from the guest device, generating, by the mobile communications device, second authentication credentials and transmitting the second authentication credentials to the guest device, where the second authentication credentials include a second expiration time after which the second authentication credentials are not valid,
where, prior to the second expiration time, the proxy server re-authenticates the guest device based on the second authentication credentials.

12. The method of claim 11, further comprising:
in response to a second proxy server in the personal network not requiring information about the guest device:
sending, by the mobile communications device to the guest device, the second connection information about the second proxy server in the personal network;
generating, by the mobile communications device, second authentication credentials for the guest device; and
sending, by the mobile communications device to the guest device, the second authentication credentials, where the second authentication credentials are used by the second proxy server to authenticate the guest device in the personal network and limit the guest device to access content stored in the personal network based on a type of access included in the second authentication credentials.

13. The method of claim 11, where a first type of access granted to the guest device is guest access such that the guest device has access to files on the personal network that are not tagged as confidential, and where a second type of access granted to the guest device is temporary access such that the guest device is re-authenticated by the proxy server at least once during a predetermined period.

14. The method of claim 13, where a third type of access granted to the guest device is full access such that the guest device has access to confidential and non-confidential files on the personal network.

15. The method of claim 12, where the guest device purges the first authentication credentials after the proxy server authenticates the guest device.

16. The method of claim 12, where the second authentication credentials are different from the first authentication credentials.

17. The method of claim 11, where sending the authentication credentials includes transmitting the authentication credentials with a short-range communication transmitter or a near field communication transmitter.

18. The method of claim 11, where generating the authentication credentials includes:
generating the first authentication credentials, and
receiving third authentication credentials from the proxy server in the personal network,
where sending the authentication credentials includes sending the first authentication credentials and the third authentication credentials.

19. A non-transitory computer-readable medium including instructions executable by at least one processor, the computer-readable medium comprising:
one or more instructions to determine that a proxy server in a personal network requires information about a guest device not associated with the personal network;
one or more instructions to request, by a mobile communications device associated with the personal network, connection information from the guest device;
one or more instructions to receive, at the mobile communications device, first connection information about the guest device;
one or more instructions to send, from the mobile communications device to the proxy server in the personal network and via a link that includes the guest device and that acts as an encrypted channel, the first connection information about the guest device;
one or more instructions to send, from the mobile communications device to the guest device, second connection information about the proxy server in the personal network, the second connection information including an internet protocol (IP) address for the proxy server;
one or more instructions to generate, by the mobile communications device authentication credentials for the guest device;
one or more instructions to send, from the mobile communications device to the guest device, the authentication credentials, where the authentication credentials are used to authenticate the guest device in the personal network and limit the guest device to access, based on a type of access included in the authentication credentials, content stored in the personal network during a guest session, where the guest device does not communicate with the proxy server until the guest device receives both the second connection information and the authentication credentials, the type of access including a privilege afforded to the guest device, the afforded privilege comprising at least one of a first privilege to receive output data from the personal network using the guest device or a second privilege to input data to the personal network using the guest device; and
one or more instructions to receive, from the proxy server in the personal network and via the link, verification regarding whether the guest device is added to the personal network,
where the authentication credentials are first authentication credentials and include information indicative of a first expiration time,
where, prior to the first expiration time, the proxy server re-authenticates the guest device based on the first authentication credentials; and
after the first expiration time, in response to receiving a request for credentials from the guest device, one or more instructions to generate, at the mobile communications device, second authentication credentials and transmit the second authentication credentials to the guest device, where the second authentication credentials include a second expiration time after which the second authentication credentials are not valid,
where, prior to the second expiration time, the proxy server re-authenticates the guest device based on the second authentication credentials.

20. The computer-readable medium of claim 19, further comprising:
one or more instructions to determine that a second proxy server in the personal network does not require information about the guest device not associated with the personal network;
one or more instructions to send, by the mobile communications device to the guest device, the second connection information about the second proxy server in the personal network;
one or more instructions to generate, by the mobile communications device, second authentication credentials for the guest device;
one or more instructions to send, by the mobile communications device to the guest device, the second authentication credentials, where the second authentication credentials are used by the second proxy server to authenticate the guest device in the personal network and limit the guest device to access content stored in the personal network based on a type of access included in the second authentication credentials.

21. The computer-readable medium of claim 19, where the personal network includes a DNLA (Digital Network Living Alliance) network.

22. The computer-readable medium of claim 19, where the guest device includes a hotel television in a hotel room.

* * * * *